(12) United States Patent
Yoshimura et al.

(10) Patent No.: US 10,776,256 B2
(45) Date of Patent: Sep. 15, 2020

(54) SHARING CONSUMED OFF-HEAP FOR PARALLEL DATA LOADING

(71) Applicant: INTERNATIONAL BUSINESS MACHINES CORPORATION, Armonk, NY (US)

(72) Inventors: Takeshi Yoshimura, Tokyo (JP); Michihiro Horie, Saitama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/981,241

(22) Filed: May 16, 2018

(65) Prior Publication Data
US 2019/0354471 A1 Nov. 21, 2019

(51) Int. Cl.
*G06F 12/02* (2006.01)
*G06F 9/50* (2006.01)

(52) U.S. Cl.
CPC ........ *G06F 12/0223* (2013.01); *G06F 9/5016* (2013.01); *G06F 12/0253* (2013.01); *G06F 2212/1041* (2013.01)

(58) Field of Classification Search
CPC .............. G06F 12/0223; G06F 12/023; G06F 12/0253; G06F 12/0692; G06F 12/084; G06F 2212/1041; G06F 9/5016; G06F 9/5022
See application file for complete search history.

(56) References Cited

U.S. PATENT DOCUMENTS

| | | | | |
|---|---|---|---|---|
| 4,811,216 A | * | 3/1989 | Bishop | G06F 9/5016 711/153 |
| 5,093,913 A | * | 3/1992 | Bishop | G06F 9/5016 711/148 |
| 7,653,720 B1 | * | 1/2010 | Steeves | H04L 12/4633 370/250 |
| 2009/0037501 A1 | * | 2/2009 | Nishiyama | G06F 12/023 |

(Continued)

OTHER PUBLICATIONS

Cornell, "Class JavaGroups.Util," Nov. 2009, https://www.cs.cornell.edu/Info/Projects/JavaGroupsNew/documentation/doc/JavaGroups.Util.html (Year: 2009).*

*Primary Examiner* — Michael Krofcheck
(74) *Attorney, Agent, or Firm* — Tutunjian & Bitetto, P.C.; Vazken Alexanian (57) ABSTRACT

A method is provided for sharing a global memory by a plurality of threads in a memory management system. The method includes allocating, by a controller of the system, thread-local memory areas in the global memory to a given thread and other threads, from among the plurality of threads. The method further includes gathering, by the controller, fragments of the thread-local memory areas previously allocated to the other threads, responsive to the fragments being scanned. The method also includes allocating, by the controller to the given thread, a requested memory size of the fragments of the thread-local memory areas previously allocated to the other threads, responsive to the fragments not being collectively smaller than the requested memory size. The method additionally includes allocating, by the controller to the given thread, a new memory area from the global memory, responsive to the fragments being collectively smaller than the requested memory size.

20 Claims, 5 Drawing Sheets

200 ⟶

(56) References Cited

U.S. PATENT DOCUMENTS

| | | | |
|---|---|---|---|
| 2009/0106507 A1* | 4/2009 | Skerlj | G06F 12/10 |
| | | | 711/154 |
| 2010/0030994 A1* | 2/2010 | Guzman | G06F 12/0223 |
| | | | 711/173 |
| 2012/0222005 A1* | 8/2012 | Harris | G06F 9/45504 |
| | | | 717/120 |
| 2012/0239899 A1* | 9/2012 | Adderly | G06F 9/5016 |
| | | | 711/170 |
| 2013/0198480 A1 | 8/2013 | Jones et al. | |
| 2014/0165072 A1* | 6/2014 | Wang | G06F 9/461 |
| | | | 718/104 |
| 2015/0007195 A1 | 1/2015 | Dai et al. | |
| 2015/0234710 A1* | 8/2015 | Berrington | G06F 11/1407 |
| | | | 707/664 |
| 2016/0026392 A1 | 1/2016 | Harris et al. | |
| 2016/0292072 A1* | 10/2016 | Edwards | G06F 12/0261 |
| 2017/0075806 A1 | 3/2017 | Li et al. | |

\* cited by examiner

SHARING CONSUMED OFF-HEAP FOR PARALLEL DATA LOADING

BACKGROUND

Technical Field

The present invention generally relates to data processing, and more particularly to sharing consumed off-heap for parallel data loading.

Description of the Related Art

Big-data processing software (e.g., Spark, Hadoop, Parquet) often consumes a large amount of heap memory. Java and Scala are commonly used big data processing software because of their ease of developments.

However, it is difficult to achieve both high performance and low engineering cost. For example, integrated Java heap management reduces engineering cost but sacrifices performance (e.g., garbage collection, lazy free, redundant buffering for file I/O). Also, off-heap memory (allocated via sun.misc.Unsafe Java APIs) increases performance but complex heap management must be re-implemented. Hence, there is a need for an improved approach for heap use that achieves both high performance and low engineering cost.

SUMMARY

According to an aspect of the present invention, a computer-implemented method is provided for sharing a global memory by a plurality of threads in a memory management system. The method includes allocating, by a controller of the memory management system, thread-local memory areas in the global memory to a given thread and other threads, from among the plurality of threads. The method further includes gathering, by the controller, fragments of the thread-local memory areas previously allocated to the other threads, responsive to the fragments being scanned. The method also includes allocating, by the controller to the given thread, a requested memory size of the fragments of the thread-local memory areas previously allocated to the other threads, responsive to the fragments not being collectively smaller than the requested memory size. The method additionally includes allocating, by the controller to the given thread, a new memory area from the global memory, responsive to the fragments being collectively smaller than the requested memory size.

According to another aspect of the present invention, a computer program product is provided for sharing a global memory by a plurality of threads in a memory management system of a computer. The computer program product includes a non-transitory computer readable storage medium having program instructions embodied therewith. The program instructions are executable by the computer to cause the computer to perform a method. The method includes allocating, by a controller of the memory management system, thread-local memory areas in the global memory to a given thread and other threads, from among the plurality of threads. The method further includes gathering, by the controller, fragments of the thread-local memory areas previously allocated to the other threads, responsive to the fragments being scanned. The method also includes allocating, by the controller to the given thread, a requested memory size of the fragments of the thread-local memory areas previously allocated to the other threads, responsive to the fragments not being collectively smaller than the requested memory size. The method additionally includes allocating, by the controller to the given thread, a new memory area from the global memory, responsive to the fragments being collectively smaller than the requested memory size.

According to yet another aspect of the present invention, a computer system is provided. The computer system includes a memory management system, having a controller and a global memory, for sharing the global memory by a plurality of threads. The controller is configured to allocate thread-local memory areas in the global memory to a given thread and other threads, from among the plurality of threads. The controller is further configured to gather fragments of the thread-local memory areas previously allocated to the other threads, responsive to the fragments being scanned. The controller is also configured to allocate, to the given thread, a requested memory size of the fragments of the thread-local memory areas previously allocated to the other threads, responsive to the fragments not being collectively smaller than the requested memory size. The controller is additionally configured to allocate, to the given thread, a new memory area from the global memory, responsive to the fragments being collectively smaller than the requested memory size.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to sharing consumed off-heap for parallel data loading.

In an embodiment, the present invention utilizes off-heap management specialized to parallel data loading. In an embodiment, the present invention leverages the following typical sequence of memory usages in parallel data loading: allocation, a single scan, and discard in many conflict-free threads.

Figure 1:
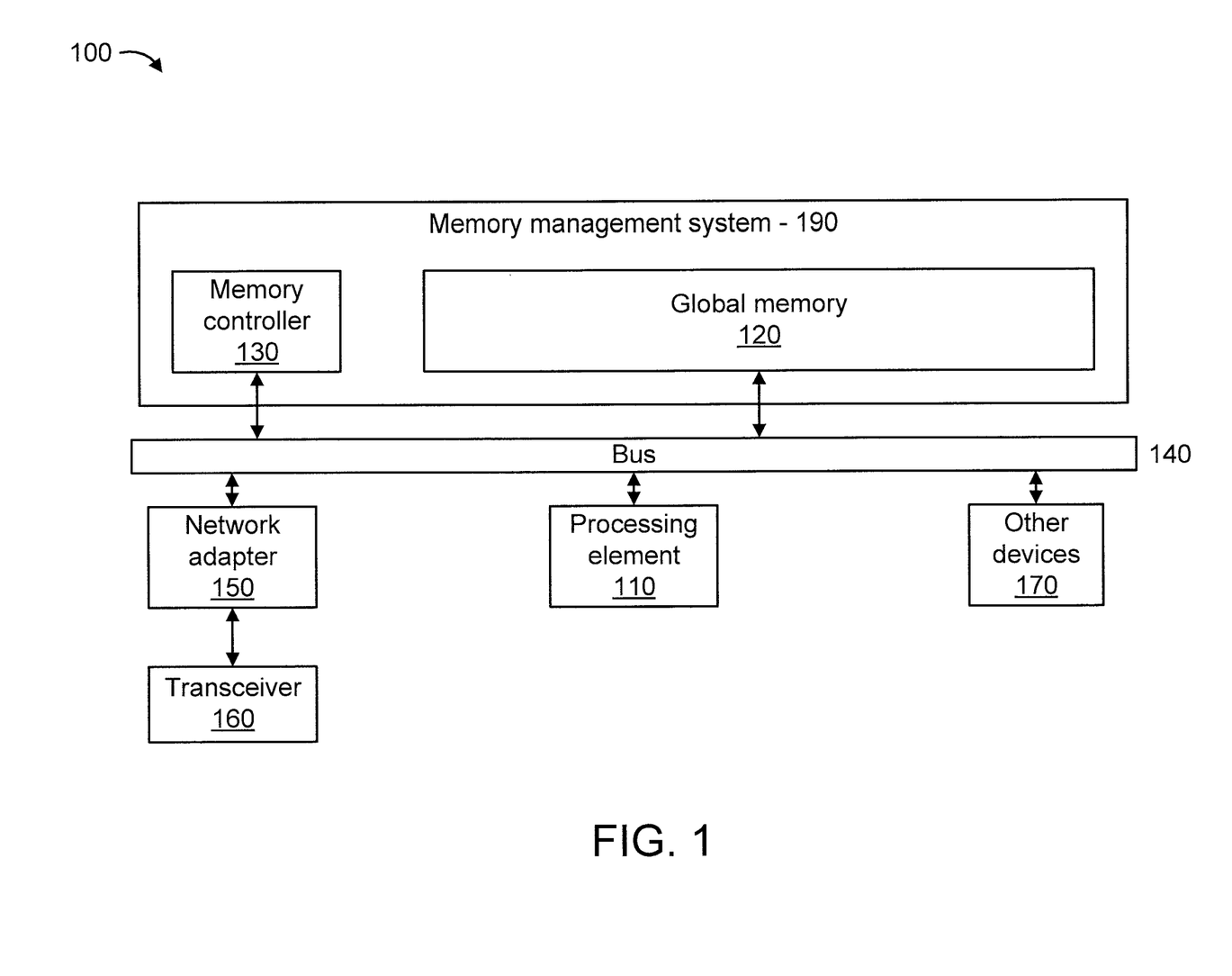
FIG. 1 is a block diagram showing an exemplary processing system to which the present invention may be applied, in accordance with an embodiment of the present invention.

FIG. 1 is a block diagram showing an exemplary computer processing system 100 to which the present invention can be applied, in accordance with an embodiment of the present invention.

The system 100 includes a processing element 110 connected to a global memory 120 and a memory controller 130 via a system bus 140. The system 100 can further include additional elements such as, for example, but not limited to, a network adapter 150, a transceiver 160, and other devices 170. The network adapter 150 and other devices 170 can be connected to the system via system bus 140. Moreover, the transceiver 160 is connected to the network adapter 150. The other devices 170 can include, but are not limited to, additional memories, peripherals (e.g., a mouse, a keyboard, and so forth).

In an embodiment, the global memory 120 and memory controller 130 can be considered to form a memory management system (also interchangeably referred to herein as a "heap management system") 190. Various features of memory management system 190 are further described herein below.

Figure 2:
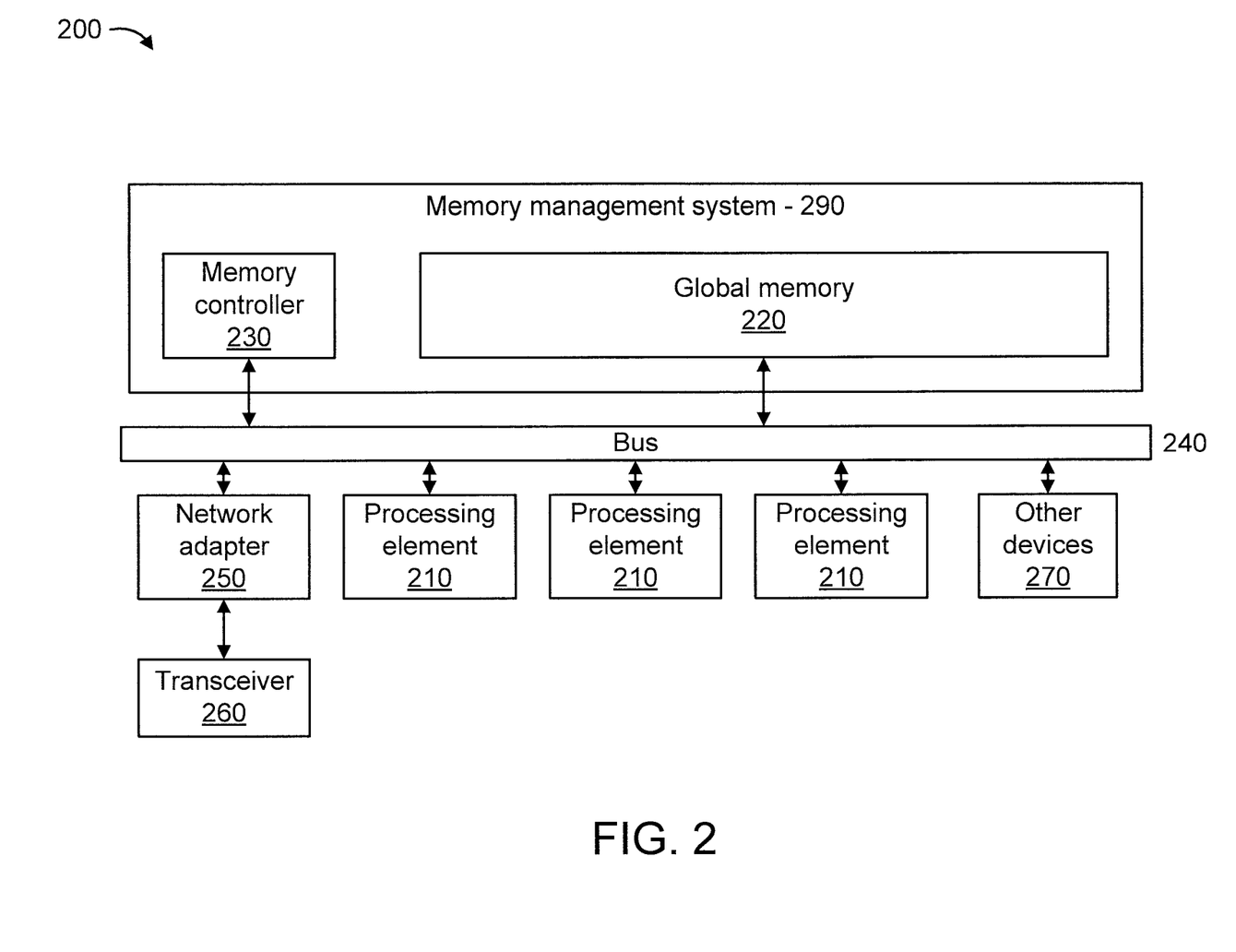
FIG. 2 is a block diagram showing another exemplary processing system to which the present invention may be applied, in accordance with an embodiment of the present invention.

FIG. 2 is a block diagram showing another exemplary computer processing system 200 to which the present invention can be applied, in accordance with an embodiment of the present invention.

The system 200 includes a set of multiple processing elements (collectively and individually denoted by the figure reference numeral) 210 connected to a global memory 220 and a memory controller 230 via a system bus 240. The system 200 can further include additional elements such as, for example, but not limited to, a network adapter 250, a transceiver 260, and other devices 270. The network adapter 250 and other devices 270 can be connected to the system via system bus 240. Moreover, the transceiver 260 is connected to the network adapter 250. The other devices 270 can include, but are not limited to, additional memories, peripherals (e.g., a mouse, a keyboard, and so forth).

In an embodiment, the global memory 220 and memory controller 230 can be considered to form a memory management system (also interchangeably referred to herein as a "heap management system") 290. Various features of memory management system 290 are further described herein below.

Of course, the processing system 100 and/or processing system 200 may also include other elements (not shown), as readily contemplated by one of skill in the art, as well as omit certain elements. For example, various input devices and/or output devices can be included in processing system 100 and/or processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 and/or processing system 200 are readily contemplated by one of ordinary skill in the art given the teachings of the present invention provided herein.

Figure 4:
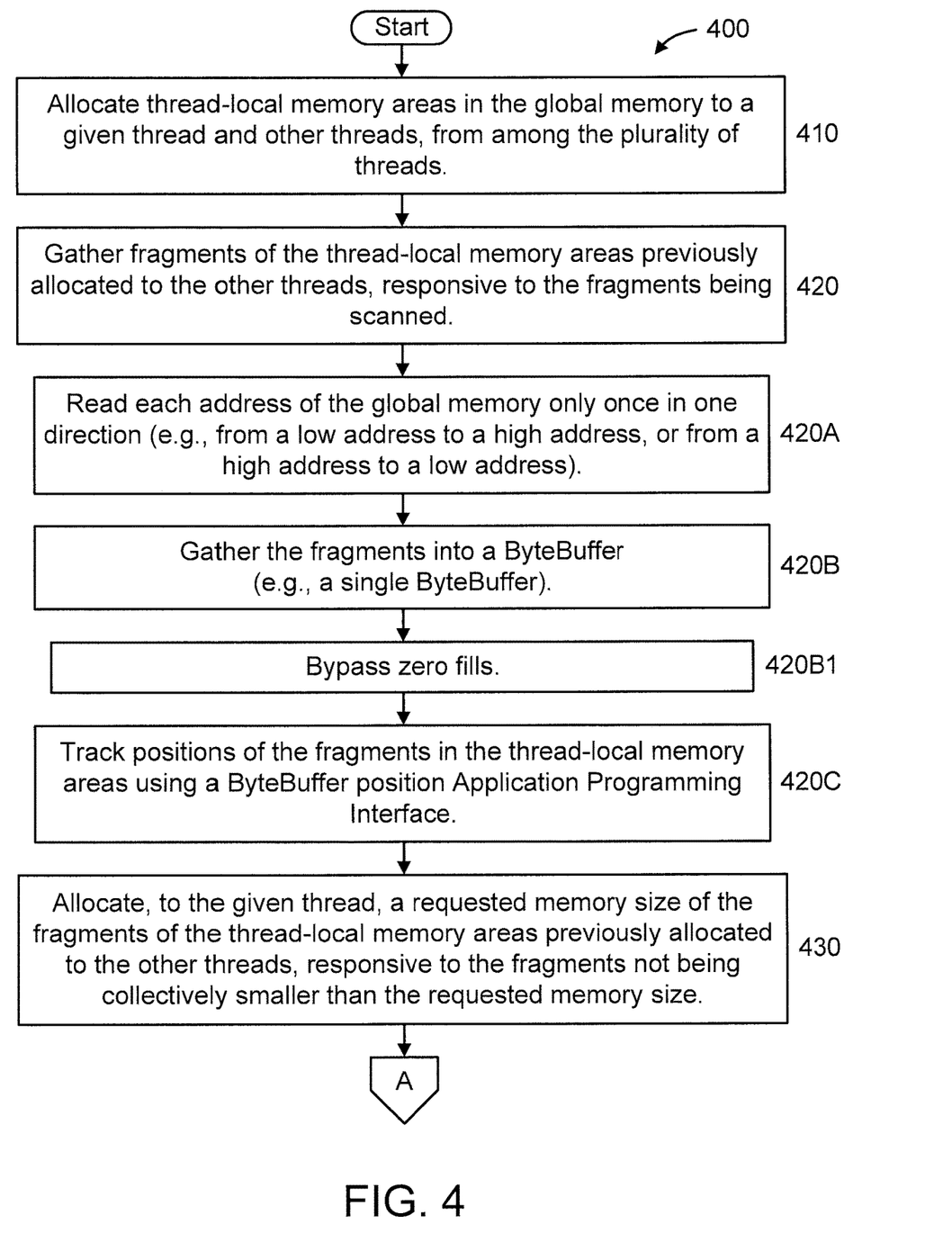
FIGS. 4-5 are flow diagrams showing an exemplary method for sharing a global memory by a plurality of threads in a memory management system, in accordance with an embodiment of the present invention.
Figure 5:
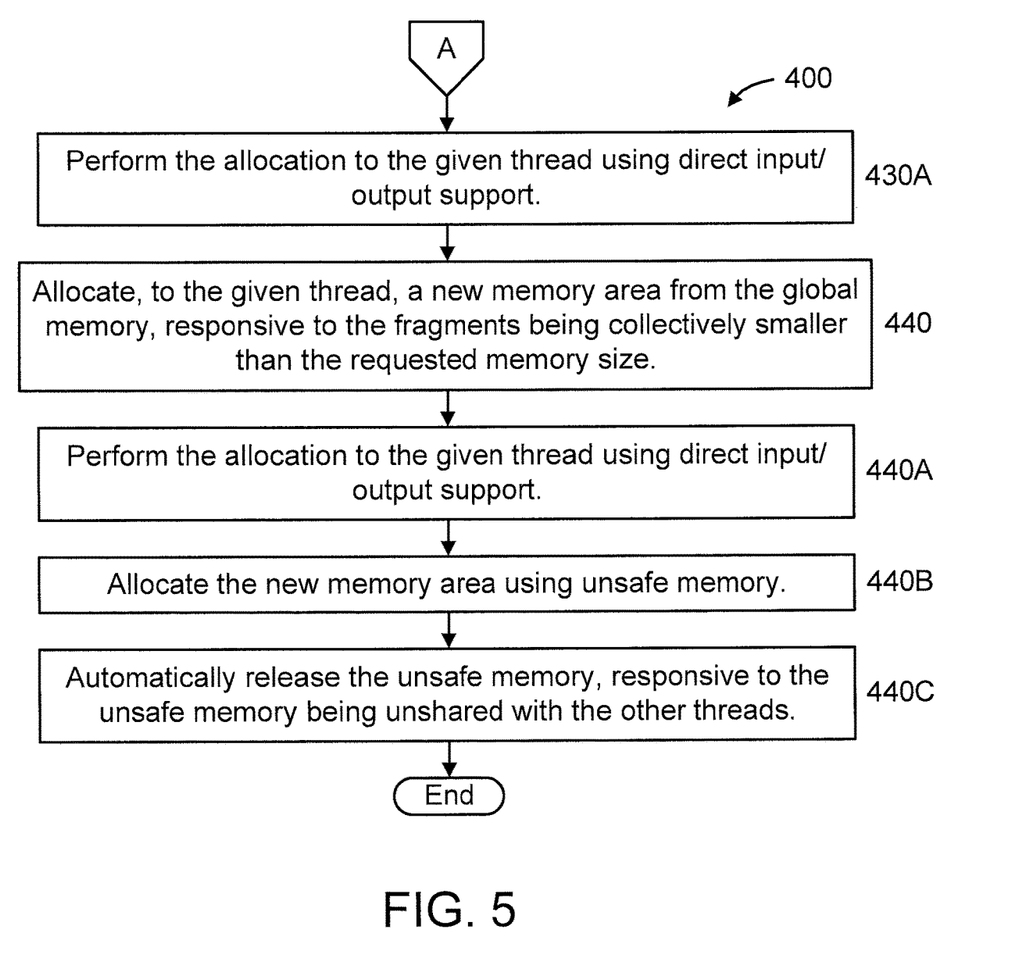

Moreover, it is to be appreciated that processing system 100 and/or processing system 200 may perform at least part of the method described herein including, for example, at least part of method 400 of FIGS. 4-5.

In an embodiment, the present invention can utilize a memory management system (e.g., memory management systems 190 and 290) that can have the following primary characteristics. The memory management system has global memory to allocate thread-local memory. The memory management system allocates the requested size of memory by gathering fragments of other thread's local memory if threads have already scanned the fragments. The memory management system allocates new memory from the global memory if the gathered fragments are smaller than the requested size. Threads must read each address of the memory only once in one direction (e.g., from a low address to a high address).

In an embodiment, the present invention can utilize a memory management system that can have the following minor characteristics. The memory management system can use bypass zero fills, unlike the existing Java DirectByteBuffer. The memory management system uses direct I/O support, unlike the existing Java HeapByteBuffer and a normal (conventional) heap.

In an embodiment, the present invention uses a heap management system with common ByteBuffer interfaces.

When a thread requests a memory allocation, the system calculates the total size of reusable (i.e., consumed) memory in other threads and re-assigns the reusable memory to a returned ByteBuffer with the requested size. Further to the preceding, the system gathers reusable memory fragments in different threads into the ByteBuffer, and provides extended interfaces to pass the fragments to file APIs as a single ByteBuffer.

The system can allocate new Unsafe memory if the reusable memory is not enough. For example, the system can be configured to support the 512-byte address alignment for direct I/O in Linux.

While a thread scans the allocated memory, the scanned position for the reusable memory calculation is automatically tracked via the ByteBuffer's position( ) API. For example, the system tracks duplicate( )'ed/slice( )'ed ByteBuffer to track the scanned position.

If the position reaches the end, the assigned Unsafe memory is automatically released if other threads do not share the memory.

Figure 3:
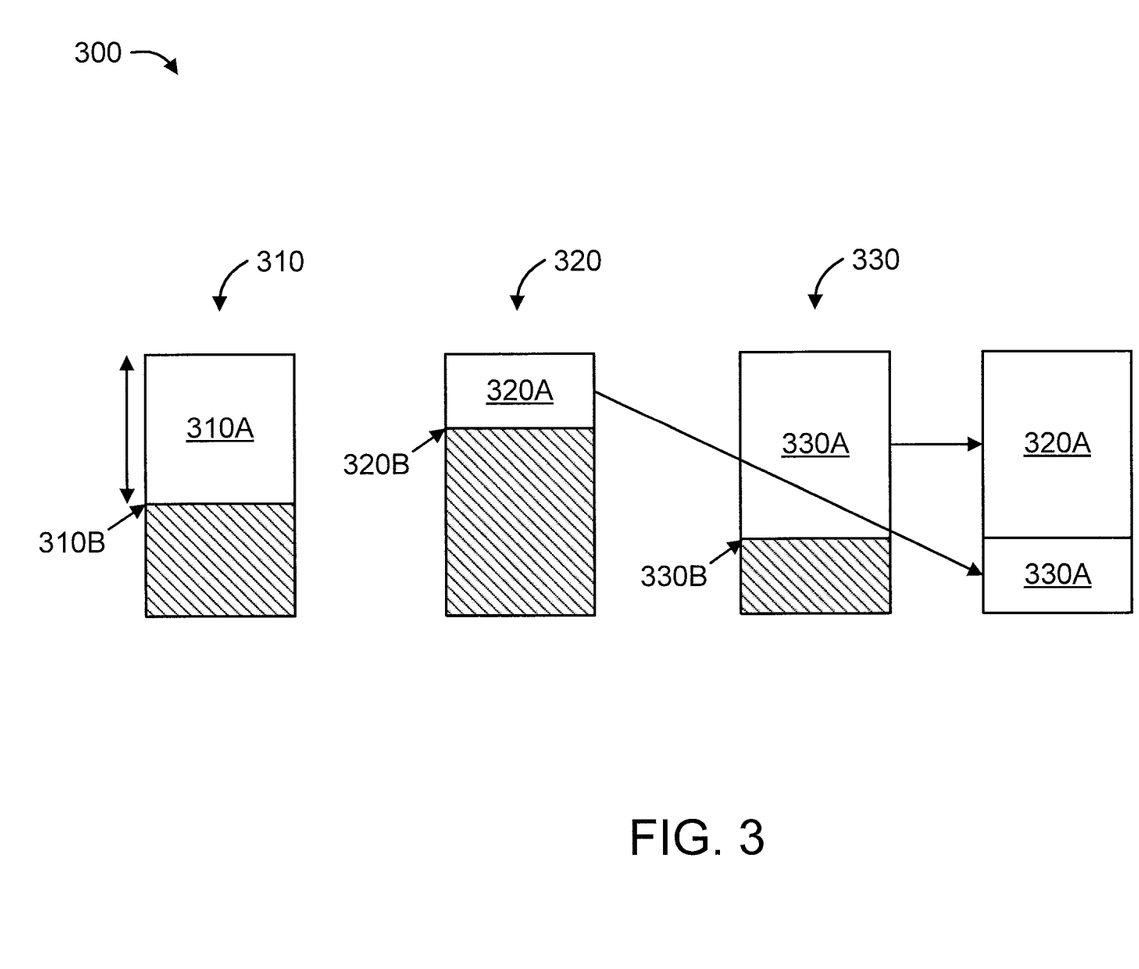
FIG. 3 is a block diagram showing an exemplary memory allocation when gathering two thread-local heaps, in accordance with an embodiment of the present invention.

FIG. 3 is a block diagram showing an exemplary memory allocation 300 when gathering two thread-local heaps, in accordance with an embodiment of the present invention.

The memory allocation 300 involves a thread A local memory 310, a thread B local memory 320, a thread C local memory 330, and a new local memory allocation for a thread 340.

Each of the local memories 310, 320, and 330 include a respective scanned (reusable) memory portion 310A, 320A, and 330A, and further include a respective current position 310B, 320B, and 330B. The respective current positions 310B, 320B, and 330B correspond to the starting positions of the reusable memory portions 310A, 320A, and 330A, respectively, in the local memories 310, 320, and 330, respectively. Regarding local memories 310, 320, and 330, the respective scanned (reusable) memory portions 310A, 320A, and 330A thereof are shown without hatching, and used memory portions thereof are shown using diagonal hatching.

As shown in FIG. 3, the upper portion 340A of the new local memory allocation for a thread 340 corresponds to the scanned (reusable) memory of thread B local memory 320, and the lower portion 340B of the new local memory allocation for a thread 340 corresponds to the scanned (reusable) memory of thread C local memory 330.

FIGS. 4-5 are flow diagrams showing an exemplary method 400 for sharing a global memory by a plurality of threads in a memory management system, in accordance with an embodiment of the present invention. In an embodiment, method 400 can be specifically used for sharing consumed off-heap for parallel data loading.

At block 410, allocate thread-local memory areas in the global memory to a given thread and other threads, from among the plurality of threads.

At block 420, gather fragments of the thread-local memory areas previously allocated to the other threads, responsive to the fragments being scanned.

In an embodiment, step 420 can include one or more of blocks 420A through 420B.

At block 420A, read each address of the global memory only once in one direction. For example, in an embodiment, each address of the global memory is read only once in the one direction, from a low address to a high address. In another embodiment, each address of the global memory is read only once in the one direction, from a high address to a low address.

At block 420B, gather the fragments into a ByteBuffer. For example, in an embodiment, the fragments are gathered into a single ByteBuffer.

In an embodiment, block 420B can include block 420B1.

At block 420B1, bypass zero fills.

At block 420C, track positions of the fragments in the thread-local memory areas using a ByteBuffer position Application Programming Interface.

At block 430, allocate, to the given thread, a requested memory size of the fragments of the thread-local memory areas previously allocated to the other threads, responsive to the fragments not being collectively smaller than the requested memory size. As used herein, the term "the fragments not being collectively smaller" refers to a sum of the fragment sizes of all the gathered fragments not being smaller than the requested memory size.

In an embodiment, block 430 can include block 430A.

At block 430A, perform the allocation to the given thread using direct input/output support.

At block 440, allocate, to the given thread, a new memory area from the global memory, responsive to the fragments being collectively smaller than the requested memory size. As used herein, the term "the fragments being collectively smaller" refers to a sum of the fragment sizes of all the gathered fragments being smaller than the requested memory size.

In an embodiment, block 440 can include one or more of blocks 440A through 440C.

At block 440A, perform the allocation to the given thread using direct input/output support.

At block 440B, allocate the new memory area using unsafe memory.

At block 440C, automatically release the unsafe memory, responsive to the unsafe memory being unshared with the other threads.

A description will now be given regarding some of the many attendant advantages of the present invention over the prior art.

For example, as one advantage, the present invention can use a JVM® Garbage Collection (GC) bypass. As another example, the present invention can perform automatic memory release. As yet another example, the present invention can include eager memory release. As still another example, the present invention can employ a JVM®-level memory reuse. As a further example, the present invention has thread awareness. Moreover, as another advantage, the present invention can perform a zero fill skip. Also, as another advantage, the present invention can use direct input/output support. These and other advantages of the present invention are readily contemplated by one of ordinary skill in the art, given the teachings of the present invention provided herein, while maintaining the spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for sharing a global memory by a plurality of threads in a memory management system, the method comprising:

allocating, by a single centralized controller of the memory management system, thread-local memory areas in an entirety of the global memory to a given thread and other threads, from among the plurality of threads;

gathering, by the single centralized controller, fragments of the thread-local memory areas previously allocated to the other threads, responsive to the fragments being scanned;

allocating, by the single centralized controller to the given thread, a requested memory size of the fragments of the thread-local memory areas previously allocated to the other threads, responsive to the fragments not being collectively smaller than the requested memory size; and allocating, by the single centralized controller to the given thread, a new memory area from the global memory, responsive to the fragments being collectively smaller than the requested memory size.

2. The computer-implemented method of claim 1, wherein said gathering step comprises reading, by the single centralized controller, each address of the global memory only once in one direction.

3. The computer-implemented method of claim 2, wherein said reading step reads the each address of the global memory only once in the one direction, from a low address to a high address.

4. The computer-implemented method of claim 2, wherein said reading step reads the each address of the global memory only once in the one direction, from a high address to a low address.

5. The computer-implemented method of claim 1, wherein the fragments are gathered into a single ByteBuffer.

6. The computer-implemented method of claim 1, further comprising bypassing zero fills.

7. The computer-implemented method of claim 1, wherein at least one of the allocating steps uses direct input/output support.

8. The computer-implemented method of claim 1, wherein the new memory area is allocated using unsafe memory.

9. The computer-implemented method of claim 8, wherein the unsafe memory is automatically released, responsive to the unsafe memory being unshared with the other threads.

10. The computer-implemented method of claim 1, further comprising tracking positions of the fragments in the thread-local memory areas using a ByteBuffer position Application Programming Interface.

11. A computer program product for sharing a global memory by a plurality of threads in a memory management system of a computer, the computer program product comprising a non-transitory computer readable storage medium having program instructions embodied therewith, the program instructions executable by the computer to cause the computer to perform a method comprising:
  allocating, by a single centralized controller of the memory management system, thread-local memory areas in the global memory to a given thread and other threads, from among the plurality of threads;
  gathering, by the single centralized controller, fragments of the thread-local memory areas previously allocated to the other threads, responsive to the fragments being scanned;
  allocating, by the single centralized controller to the given thread, a requested memory size of the fragments of the thread-local memory areas previously allocated to the other threads, responsive to the fragments not being collectively smaller than the requested memory size; and
  allocating, by the single centralized controller to the given thread, a new memory area from the global memory, responsive to the fragments being collectively smaller than the requested memory size.

12. The computer-implemented method of claim 11, wherein said gathering step comprises reading, by the single centralized controller, each address of the global memory only once in one direction.

13. The computer-implemented method of claim 12, wherein said reading step reads the each address of the global memory only once in the one direction, from a low address to a high address.

14. The computer-implemented method of claim 12, wherein said reading step reads the each address of the global memory only once in the one direction, from a high address to a low address.

15. The computer-implemented method of claim 11, wherein the fragments are gathered into a single ByteBuffer.

16. The computer-implemented method of claim 11, further comprising bypassing zero fills.

17. The computer-implemented method of claim 11, wherein at least one of the allocating steps uses direct input/output support.

18. The computer-implemented method of claim 11, wherein the new memory area is allocated using unsafe memory.

19. The computer-implemented method of claim 18, wherein the unsafe memory is automatically released, responsive to the unsafe memory being unshared with the other threads.

20. A computer system, comprising:
  a memory management system, having a single centralized controller and a global memory, for sharing the global memory by a plurality of threads,
  wherein the single centralized controller is configured to
    allocate thread-local memory areas in the global memory to a given thread and other threads, from among the plurality of threads;
    gather fragments of the thread-local memory areas previously allocated to the other threads, responsive to the fragments being scanned;
    allocate, to the given thread, a requested memory size of the fragments of the thread-local memory areas previously allocated to the other threads, responsive to the fragments not being collectively smaller than the requested memory size; and
    allocate, to the given thread, a new memory area from the global memory, responsive to the fragments being collectively smaller than the requested memory size.

* * * * *